(12) United States Patent
Kiuchi et al.

(10) Patent No.: US 7,790,069 B2
(45) Date of Patent: Sep. 7, 2010

(54) FLAME-RETARDANT THERMOPLASTIC RESIN COMPOSITION

(75) Inventors: Yukihiro Kiuchi, Tokyo (JP); Tsunenori Yanagisawa, Tokyo (JP); Syukichi Tanaka, Tokyo (JP); Makoto Soyama, Tokyo (JP); Kazuhiko Inoue, Tokyo (JP); Masatoshi Iji, Tokyo (JP)

(73) Assignee: NEC Corporation, Tokyo (JP)

( * ) Notice: Subject to any disclaimer, the term of this patent is extended or adjusted under 35 U.S.C. 154(b) by 192 days.

(21) Appl. No.: 10/583,463

(22) PCT Filed: Dec. 3, 2004

(86) PCT No.: PCT/JP2004/018009

§ 371 (c)(1),
(2), (4) Date: Jun. 19, 2006

(87) PCT Pub. No.: WO2005/061626

PCT Pub. Date: Jul. 7, 2005

(65) Prior Publication Data

US 2008/0071015 A1    Mar. 20, 2008

(30) Foreign Application Priority Data

Dec. 19, 2003 (JP) ............... 2003-422239

(51) Int. Cl.
*C09K 21/00* (2006.01)
*C09K 21/02* (2006.01)
*C08G 64/02* (2006.01)
(52) U.S. Cl. .............. 252/601; 252/606; 252/609
(58) Field of Classification Search ............. 524/261; 252/609
See application file for complete search history.

(56) References Cited

U.S. PATENT DOCUMENTS

| 5,096,762 | A | * | 3/1992 | Yoshida et al. ............... 428/76 |
| 5,445,807 | A | * | 8/1995 | Pearson ...................... 423/625 |
| 5,593,778 | A | * | 1/1997 | Kondo et al. ................. 428/373 |
| 5,985,165 | A | * | 11/1999 | Fukuta et al. ................. 216/93 |
| 6,043,306 | A | * | 3/2000 | Imahashi ..................... 524/436 |

(Continued)

FOREIGN PATENT DOCUMENTS

JP     9-143350     6/1997

(Continued)

OTHER PUBLICATIONS

Machine translation for JP 2003-192925, Sep. 7, 2003, Yamada et al.*

(Continued)

*Primary Examiner*—Randy Gulakowski
*Assistant Examiner*—Robert Loewe
(74) *Attorney, Agent, or Firm*—Dickstein Shapiro LLP

(57) ABSTRACT

A flame-retardant thermoplastic resin composition comprising at least a plant-derived resin (A) and a flame retardant (B), wherein the weight proportions of the individual components in the flame-retardant thermoplastic resin composition are:

$30 \leq W_1 < 55.5$ $44.5 < X_1 \leq 70$ wherein $W_1$ is the percentage by mass of the plant-derived resin (A) and $X_1$ is the percentage by mass of the flame retardant (B), and 90% by mass or more of the flame retardant (B) is composed of a metal hydrate containing an alkali metal-based substance in an amount of 0.2% by mass or less.

14 Claims, 2 Drawing Sheets

U.S. PATENT DOCUMENTS

| | | | |
|---|---|---|---|
| 6,114,496 A * | 9/2000 | Otera et al. | 528/361 |
| 6,184,312 B1 * | 2/2001 | Yamamoto et al. | 525/474 |
| 6,232,377 B1 * | 5/2001 | Hayashi et al. | 524/100 |
| 6,277,908 B1 * | 8/2001 | Yamamoto | 524/436 |
| 6,451,906 B1 * | 9/2002 | Saito et al. | 524/588 |
| 6,639,031 B1 * | 10/2003 | Poetsch et al. | 526/129 |
| 6,737,372 B2 * | 5/2004 | Minami et al. | 442/340 |
| 6,919,061 B1 * | 7/2005 | Sherman et al. | 423/421 |
| 7,192,538 B2 * | 3/2007 | Fujihana et al. | 252/511 |
| 2001/0036438 A1 * | 11/2001 | Yamamoto et al. | 423/625 |
| 2002/0022127 A1 * | 2/2002 | Katsuda et al. | 428/402 |
| 2002/0099160 A1 * | 7/2002 | Shiping | 528/10 |
| 2003/0012728 A1 * | 1/2003 | Kato et al. | 423/629 |
| 2003/0162011 A1 * | 8/2003 | Imahashi et al. | 428/323 |
| 2004/0143068 A1 * | 7/2004 | Honda et al. | 525/199 |
| 2005/0014871 A1 * | 1/2005 | Chin | 524/99 |
| 2005/0131129 A1 * | 6/2005 | Uehara et al. | 524/502 |
| 2005/0143502 A1 * | 6/2005 | Yamada et al. | 524/115 |

FOREIGN PATENT DOCUMENTS

| | | | |
|---|---|---|---|
| JP | 11-140329 | | 5/1999 |
| JP | 2000-351822 | | 12/2000 |
| JP | 2001-40219 | | 2/2001 |
| JP | 2001-40229 | | 2/2001 |
| JP | 2002-60602 | | 2/2002 |
| JP | 2002-105255 | | 4/2002 |
| JP | 2003-192925 | | 7/2003 |
| JP | 2003-213145 | | 7/2003 |
| JP | 2004-263180 | | 9/2004 |
| JP | 2004-307528 | | 11/2004 |
| WO | WO0179354 | * | 10/2001 |
| WO | WO02090440 | * | 11/2002 |

OTHER PUBLICATIONS

International Search Report dated Feb. 8, 2005.

* cited by examiner

US 7,790,069 B2

FLAME-RETARDANT THERMOPLASTIC RESIN COMPOSITION

TECHNICAL FIELD

The present invention relates to a flame-retardant thermoplastic resin composition containing a plant-derived resin, which is superior in flame retardancy and practical performances.

BACKGROUND ART

In recent years, attention has been paid to plant-derived resins as a substitute for petroleum-derived resins, and active investigations have been made on the practical use of resin compositions using such plant-derived resins. In recent years, attention has been paid particularly to biodegradable resins (including a polylactic acid), as a resin composition using a plant-derived resin, and these biodegradable resins are being commercialized in various applications. The applications of the biodegradable resins are highly diversified from those applications in which the use period of the resins is short and they are disposed after use, such as packaging for container, film for agricultural use, and the like, to those applications requiring high function in which the initial properties of the resins can be maintained for a long period, such as housing for home electric appliance or OA apparatus, automotive part, and the like.

However, the plant-derived resins generally burn easily and cause a disaster and threatens the people' safety; therefore, when they are used in applications requiring a high degree of flame retardancy, such as housing for home electric appliance or OA apparatus, automotive part, and the like, flame retardancy is required to be improved. When a resin composition containing a plant-derived resin is used particularly in a casing for electric appliance, the resin composition must satisfy flame retardancy standards including the UL Standard of U.S.A. However, conventional resin compositions containing a plant-derived resin have been unable to satisfy the above flame retardancy standards.

For making flame-retardant a resin, there is generally considered a method of adding, to a resin, a halogen-based flame retardant (e.g. a bromine compound) high in flame retardancy efficiency. When this halogen-based flame retardant is added to a polycarbonate resin, which typifies polyester resins, however, there is a problem that the resin is deteriorated when subjected to repeated melting and kneading for the purpose of reuse, resulting in a reduction in properties such as flame retardancy, impact resistance and the like. Therefore, when the halogen-based flame retardant is added to a polylactic acid resin containing ester bond (which typifies plant-derived resins), there has been a fear that, when subjected to repeated melting and kneading, the polylactic acid resin gives rise to a reduction in properties similarly to the above-mentioned case of polycarbonate resin.

Meanwhile, there is disclosed, in patent Literature 1, a biodegradable resin composition obtained by adding, to a polylactic acid resin, at least one kind of flame retardant additive selected from phosphorus compounds, hydroxide compounds (they are referred to also as metal hydrates and include aluminum hydroxide) and silica compounds.

In the patent Literature 1, phosphorus compounds are shown as an example of the flame retardant additive. While the phosphorus compounds generally plasticize a resin easily and are very effective for the resin's improvement in fluidity, there have been cases that this easy plasticization reduces the heat resistance [in particular, heat distortion temperature (HDT)] and mechanical properties of phosphorus compound-containing resin composition.

Patent Literature 1: JP-A-2003-192925

DISCLOSURE OF THE INVENTION

Problem to be Solved by the Invention

The technical task of the present invention is to provide a flame-retardant thermoplastic resin composition containing a plant-derived resin, having superior flame retardancy and practical performances, without using any halogen-based flame retardant.

Means for Solving Problem

Hence, the present inventors made a study in order to develop a flame-retardant thermoplastic resin composition containing a plant-derived resin, superior in flame retardancy and practical performances, without using any halogen-based flame retardant.

To begin with, when a resin is kneaded, under heating, with a metal hydrate including aluminum hydroxide as a flame retardant, to obtain a mixture (hereinafter, this is referred to as resin composition) and particularly when the resin is an ester bond-containing resin, the resin is hydrolyzed by the influenced of the alkali metal-based substance (e.g. $Na_2O$) contained in the metal hydrate, and the molecular weight is reduced. With such a reduction in resin molecular weight, the resin composition is improved in fluidity but results in deterioration in important properties such as flame retardancy and the like. In the case of, in particular, a polylactic acid resin and polyester resins (which are analogs of the polylactic acid resin), the presence of a very small amount of alkali-based substance easily causes hydrolysis and molecular weight reduction of resin during the kneading or use, which deteriorates the practical performances of resin composition, such as flame retardancy, heat resistance, mechanical properties and the like. Thus, use of a hydroxide type compound (this is also called a metal hydrate) such as described in the patent Literature 1 gives rise to molecular weight reduction of polylactic acid resin, and making it impossible to obtain sufficient flame retardancy and practical performances; therefore, it has been difficult to apply such a resin composition to applications where stable practical performances are required over a long period, such as casing for OA apparatus and the like.

Also in the Patent Literature 1 is disclosed a case of using, as a hydroxide compound (this is also called a metal hydrate), aluminum hydroxide having a purity of 99.5% by mass or more. The total amount of the impurities contained in the metal hydrate described in the patent Literature 1 is 0.5% by mass, and $Fe_2O_3$, $SiO_2$, $Na_2O$, etc are shown as impurities. However, in the patent Literature 1, the content of the alkali metal-based substance (including, for example, $Na_2O$), which is an impurity most affecting the hydrolysis of polyester resins typified by polylactic acid resin, is not disclosed at all. Further, since sodium hydroxide (NaOH) is inevitably used in production of aluminum hydroxide, the proportion of alkali metal-based substance (which can be expressed, for example, as $Na_2O$) in the impurities contained in metal hydrate is largest, and the above problem is significant.

In consideration of the above, it was found in the present invention that superior flame retardancy and superior practical performances (including hydrolysis resistance) can be achieved by using, in making flame-retardant a plant-derived resin (including a polylactic acid resin containing ester bond in the molecular structure) with a metal hydrate, a special metal hydrate wherein the content of alkali metal-based substance has been reduced to a given level or lower (particularly 0.2% by mass or less). Such a metal hydrate wherein the content of alkali metal-based substance has been reduced to 0.2% by mass or less, can be obtained by conducting a treatment, for example, multiple water-washing, for intended concentration control.

For making a plant-derived resin highly flame-retardant with the above-mentioned special metal hydrate alone, the metal hydrate need be added in a large amount, which reduces, in some cases, the fluidity of the resulting resin composition. Therefore, in molding such a resin composition into a thin (small thickness) molded material, enhancement of fluidity has been needed for the resin composition. With respect to this, it was further found that the use amount of aluminum hydroxide low in content of alkali metal-based substance can be reduced by adding at least one kind of aromatic ring-containing compound selected from phenols, silicone compounds and boron compounds and, thereby, not only high flame retardancy but also good fluidity can be uniquely obtained. It was furthermore found that use of an inorganic nucleating agent (e.g. a clay mineral), in addition to the above-mentioned aromatic ring-containing compound, can promote the crystallization of resin and, moreover, can significantly enhance flame retardancy.

Hence, the present invention provides the following flame-retardant thermoplastic resin compositions.

The flame-retardant thermoplastic resin composition according to the first aspect of the present invention is a flame-retardant thermoplastic resin composition comprising at least a plant-derived resin (A) and a flame retardant (B), wherein the weight proportions of the individual components in the flame-retardant thermoplastic resin composition are:

$$30 \leq W_1 < 55.5$$

$$44.5 < X_1 \leq 70$$

wherein $W_1$ is the percentage by mass of the plant-derived resin (A) and $X_1$ is the percentage by mass of the flame retardant (B), and 90% by mass or more of the flame retardant (B) is composed of a metal hydrate containing an alkali metal-based substance in an amount of 0.2% by mass or less.

The flame-retardant thermoplastic resin composition according to the second aspect of the present invention is a flame-retardant thermoplastic resin composition comprising at least a plant-derived resin (A), a flame retardant (B) and an aromatic ring-containing compound (C), wherein the weight proportions of the individual components in the flame-retardant thermoplastic resin composition are:

$$25 \leq W_2 < 55.5$$

$$39.5 \leq X_2 \leq 70$$

$$0.5 \leq Y \leq 20$$

wherein $W_2$ is the percentage by mass of the plant-derived resin (A), $X_2$ is the percentage by mass of the flame retardant (B), and Y is the percentage by mass of the aromatic ring-containing compound (C), and 90% by mass or more of the flame retardant (B) is composed of a metal hydrate containing an alkali metal-based substance in an amount of 0.2% by mass or less.

The flame-retardant thermoplastic resin composition according to the third aspect of the present invention is a flame-retardant thermoplastic resin composition comprising at least a plant-derived resin (A), a flame retardant (B), an aromatic ring-containing compound (C) and a nucleating agent (D), wherein the weight proportions of the individual components in the flame-retardant thermoplastic resin composition are:

$$25 \leq W_3 < 55.5$$

$$29.5 < X_3 \leq 70$$

$$0.5 \leq Y \leq 20$$

$$0.05 < Z \leq 20$$

wherein $W_3$ is the percentage by mass of the plant-derived resin (A), $X_3$ is the percentage by mass of the flame retardant (B), Y is the percentage by mass of the aromatic ring-containing compound (C), and Z is the percentage by mass of the nucleating agent (D), and 90% by mass or more of the flame retardant (B) is composed of a metal hydrate containing an alkali metal-based substance in an amount of 0.2% by mass or less.

Effect of the Invention

As described above, the present invention can realize a flame-retardant thermoplastic resin composition containing a plant-derived resin, superior in flame retardancy and practical performances, without using any halogen-based flame retardant.

That is, in the present invention, firstly, an unique effect is obtained in improvement of flame retardancy by using, as a flame retardant, a metal hydrate wherein the content of alkali metal-based substance is 0.2% by mass or less; further, an unique effect is obtained in improvement of flame retardancy and fluidity by adding an aromatic ring-containing compound; in addition, an effect of further improvement in fame retardancy is obtained by adding the aromatic ring-containing compound in combination with a nucleating agent.

BEST MODE FOR CARRYING OUT THE INVENTION

Figure 1:
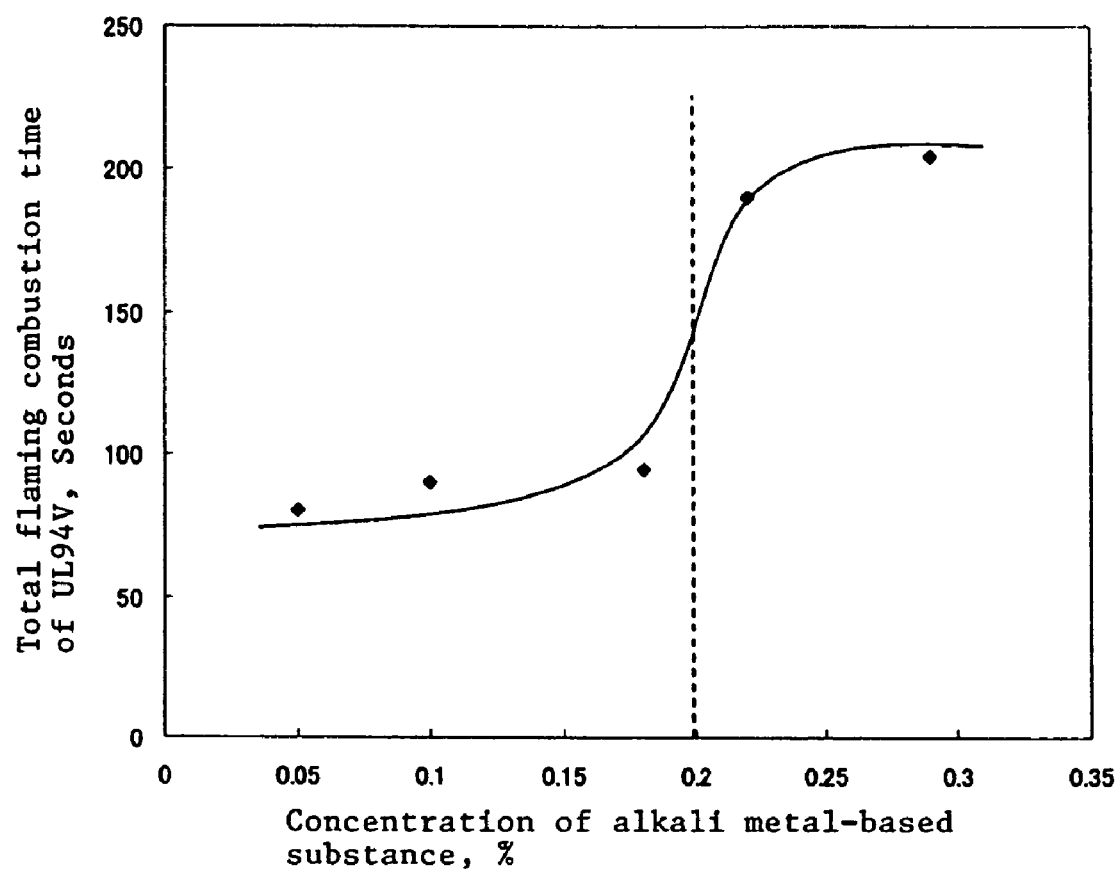
FIG. 1 shows a relation between the concentration of alkali metal-based substance and the total flaming combustion time of UL 94V Standard, in Examples 1 to 3 and Comparative Examples 1 and 2.

The present invention is described in more detail below.

The present invention is related to a flame-retardant thermoplastic resin composition comprising at least a plant-derived resin (A) and a flame retardant (B).

In the present invention, the plant-derived resin (A) is not particularly limited, as long as it is derived from a plant. There can be used for example, a polylactic acid or succinic acid, obtained from a carbohydrate (as a starting material) contained in corn, potato or the like. The plant-derived resins based on succinic acid include esters such as polybutylene succinate and the like. Plant-derived resins also include polysaccharides such as starch, amylose, cellulose, cellulose ester, chitin, chitosan, gellan gum, carboxyl group-containing cellulose, carboxyl group-containing starch, pectic acid, alginic acid and the like.

For example, poly-β-hydroxyalkanoate (e.g. Biopol (trade name) produced by Zeneca Co.) which is a polymer of hydroxybutylate and/or hydroxyvalerate, synthesized by microorganisms, is not derived from a plant; however, it has the same significance as plant-derived resins from a standpoint that no petroleum resource is required, and it can be used in the present invention.

Lignin is a dehydrogenated polymer of coniferyl alcohol and sinapyl alcohol, contained in wood in an amount of 20 to 30% by mass; and its modification product is also a plant-derived resin. Therefore, in the present invention, there can also be used thermosetting resins using a plant-derived raw material such as lignin, hemicellulose, cellulose or the like.

Of these plant-derived resins, preferred are artificially synthesized biodegradable oligomers and polymers, modification products of artificially synthesized biodegradable oligomers and polymers, and modification products of naturally synthesized biodegradable oligomers and polymers, because they have an appropriate inter-molecular bonding force and accordingly are superior in thermoplasticity, show no striking viscosity increase during fusing, and have good moldability. Particularly preferred are crystalline polyesters and modification products thereof, and more preferred are aliphatic polyesters and modification products thereof. Also preferred are poly(amino acid)s and modification products thereof, and more preferred are aliphatic poly(amino acid)s and modification products thereof. Also preferred are polyols and modification products thereof, and more preferred are aliphatic polyols and modification products thereof.

It is possible to mix a petroleum-derived resin into a plant-derived resin. There can be mentioned alloys between the above-mentioned plant-derived resin and a thermosetting resin such as a petroleum-derived resin, such as polypropylene, polystyrene, ABS, nylon, polyethylene terephthalate, polybutylene terephthalate, polycarbonate, urea resin, melamine resin, alkyd resin, acrylic resin, unsaturated polyester resin, diallyl phthalate resin, epoxy resin, silicone resin, cyanate resin, isocyanate resin, furan resin, ketone resin, xylene resin, thermosetting polyimide, thermosetting polyamide, styrylpyridine resin, nitrile-terminated resin, addition-curing quinoxaline, addition-curing polyquinoxaline resin, or the like. When a thermosetting resin is used together with the plant-derived resin, there can be used a curing agent and a curing accelerator, required in a curing reaction.

In the flame-retardant thermoplastic resin composition according to the first aspect of the present invention [which is a flame-retardant thermoplastic resin composition comprising at least a plant-derived resin (A) and a flame retardant (B)], the weight proportion (expressed as $X_1$) of the flame retardant (B) in the flame-retardant thermoplastic resin composition is particularly preferably in the following range because good flame retardancy and good moldability is obtained:

$$44.5\% \text{ by mass} < X_1 \leq 70\% \text{ by mass}$$

When $X_1$ is 44.5% by mass or less, flame retardancy may be insufficient. When $X_1$ is more than 70% by mass, fluidity is insufficient and it may be difficult to apply the resin composition to a thin (small thickness) molded material wherein high-degree moldability is required.

In the flame-retardant thermoplastic resin composition according to the second aspect of the present invention [which is a flame-retardant thermoplastic resin composition comprising at least a plant-derived resin (A), a flame retardant (B) and an aromatic ring-containing compound (C)], the weight proportion (expressed as $X_2$) of the flame retardant (B) in the flame-retardant thermoplastic resin composition is particularly preferably in the following range because good flame retardancy and good moldability is obtained:

$$39.5\% \text{ by mass} \leq X_2 \leq 70\% \text{ by mass}$$

When $X_2$ is less than 39.5% by mass, flame retardancy may be insufficient. When $X_2$ is more than 70% by mass, fluidity is insufficient and it may be difficult to apply the resin composition to a thin molded material wherein high-degree moldability is required.

In the flame-retardant thermoplastic resin composition according to the third aspect of the present invention [which is a flame-retardant thermoplastic resin composition comprising at least a plant-derived resin (A), a flame retardant (B), an aromatic ring-containing compound (C) and a nucleating agent (D)], the weight proportion (expressed as $X_3$) of the flame retardant (B) in the flame-retardant thermoplastic resin composition is particularly preferably in the following range because good flame retardancy and good moldability is obtained:

$$29.5\% \text{ by mass} < X_3 \leq 70\% \text{ by mass}$$

When $X_3$ is 29.5% by mass or less, flame retardancy may be insufficient. When $X_3$ is more than 70% by mass, fluidity is insufficient and it may be difficult to apply the resin composition to a thin molded material wherein high-degree moldability is required.

In the present invention, it is particularly preferred that 90% by mass or more of the flame retardant (B) is a metal hydrate containing an alkali metal-based substance in an amount of 0.2% by mass or less, because, when a plant-derived resin containing ester bond (typified, for example, by a polylactic acid resin) and such a flame retardant (B) are used in combination, the molecular weight reduction of the plant-derived resin is reduced (good hydrolysis resistance) and the composition is superior in flame retardancy.

As such a metal hydrate, there are preferred metal hydrates such as aluminum hydroxide, magnesium hydroxide, dawsonite, calcium aluminate, gypsum hydrate, calcium hydroxide, zinc borate, barium metaborate, borax, kaolin clay, calcium carbonate and the like; metal hydrates whose surfaces have been treated with an organic substance such as epoxy resin, phenolic resin or the like; and metal hydrates wherein a metal is in a state of solid solution. Of these, aluminum hydroxide is particularly preferred because it has a high heat-absorbability and is superior in flame retardancy.

In the present invention, it is preferred that the 50 mass % particle diameter of the metal hydrate is in a range of 0.5 μm to 20 μm, because such a metal hydrate has good dispersibility in the plant-derived resin contained in the flame-retardant thermoplastic resin composition of the present invention and is effective for enhancement of flame retardancy and mechanical properties.

In addition, when the 50 mass % particle diameter of the metal hydrate is 0.5 μm or more, the flame-retardant thermoplastic resin composition containing such a metal hydrate (this composition refers to a flame-retardant thermoplastic resin composition of the present invention comprising a plant-derived resin and other additives) shows neither viscosity increase nor reduction in moldability caused thereby. Further, since there is no viscosity increase or no resultant increase in shear force during kneading or molding, there occurs no deterioration of drip-proof agent [this refers to, for example, polytetrafluoroethylene (PTFE)] or organic or inorganic fibrous substance which is expected to provide enhanced mechanical properties (enhanced impact resistance, in particular); thus, sufficient flame retardancy and mechanical properties can be obtained.

In addition, when the 50 mass % particle diameter of the metal hydrate is 20 μm or less, the flame-retardant thermoplastic resin composition containing such a metal hydrate is superior in surface properties and shows no surface unevenness or no deterioration in appearance.

In the present invention, as to the aromatic ring-containing compound (C), there is no particular restriction as long as it is a compound which has a melt viscosity lower than the plant-derived resin (A) when kneaded or molded in combination with the present plant-derived resin (A). However, particularly preferred as the aromatic ring-containing compound (C) are, for enhancement of flame retardancy and fluidity, a phenol, a silicone compound, a boron compound, etc., all of which are superior in thermal decomposition resistance and tend to form a carbonized component (referred to also as char).

As to the phenol, there is no particular restriction as long as it causes neither vaporization nor decomposition at the kneading or molding temperature of resin. Phenolic resins generally used as a curing agent for epoxy resin can be used. As examples of these phenolic resins, there can be mentioned phenol novolac resin, cresol novolac resin, phenol xylene aralkyl type resin, phenol biphenylene aralkyl type resin, bisphenol A type phenolic resin, bisphenol F type phenolic resin, bisphenol S type phenolic resin, phenolic resin of biphenyl isomer dihydroxy ether type, naphthalenediol type phenolic resin, phenol diphenyl ether aralkyl type resin, naphthalene-containing novolac type resin, anthracene-containing novolac resin, fluorene-containing novolac type resin, bisphenol fluorene-containing novolac type resin, bisphenol F-containing novolac type phenolic resin, bisphenol A-containing novolac type phenolic resin, phenol biphenylene triazine type resin, phenol xylylene triazine type resin, phenol triazine type resin, trisphenylolethane type resin, tetraphenylolethane type resin, polyphenol type resin, aromatic ester type phenolic resin, cyclic aliphatic ester-containing phenolic resin, ether ester type phenolic resin and phenoxy resin. Also, as other phenols, there can be mentioned biphenol, xylenol, bisphenol-A, bisphenol-F, bisphenol-S, catechol and catechol resin. There can also be used catechol biphenylene aralkyl resin, catechol xylylene aralkyl resin, etc., obtained by copolymerizing catechol and an aromatic derivative. There may also be used lignin and analogs thereof (e.g. lignophenol).

As phenols are easily oxidized, in applications wherein good appearance is required, it is generally preferred to use a compound used as an antioxidant, in combination with a phenol. Also, a compound obtained by converting the phenolic hydroxyl group of phenol into a glycidyl form or an ethylene oxide adduct form, does not change into a quinone structure which causes coloring of phenolic resin; therefore, a flame-retardant thermoplastic resin composition of the present invention, containing the above compound is superior in appearance.

The silicone compound may be a branched chain or a straight chain as long as it is an aromatic ring-containing organosilane and causes neither vaporization nor decomposition at the kneading temperature or molding temperature of resin, and there is no particular restriction as to its structure. As the silicone compound of branched structure, there are preferred those containing a unit (T unit) represented by formula $RsiO_{1.5}$. The silicone compound of branched structure may further contain a unit (Q unit) represented by formula $SiO_{2.0}$. Particularly preferred for improved flame retardancy are those silicone compounds whose branched structure is constituted by a unit (T unit) represented by formula $RsiO_{1.5}$, a unit (D unit) represented by formula $R_2SiO_{1.0}$ and a unit (M unit) represented by formula $R_3SiO_{0.5}$. Silicone compounds of such a structure can enhance flame retardancy. The silicone compound of straight chain refers to one constituted by a unit (D unit) represented by formula $R_2SiO_{1.0}$ and a unit (M unit) represented by formula $R_3SiO_{0.5}$. Such silicone compounds are effective not only in enhancement of flame retardancy and fluidity but also in improvement of impact resistance. As such silicone compounds, there can be mentioned, for example, a silicone compound of the following structure.

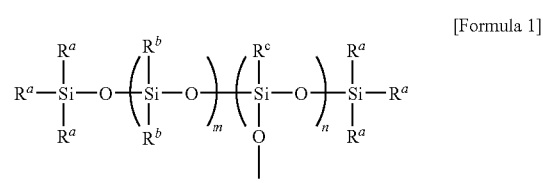

[Formula 1]

The above formula is intended to show an example of the structure of the silicone compound, and the structure of the silicone compound is not restricted particularly to the above structure. $R^a$, $R^b$ and $R^c$ in the above formula may be the same or different from each other and must have aromatic ring-containing substituent in them and besides may have substituent selected form hydrogen atom, hydroxyl group, alkoxyl groups of 1 to 5 carbon atoms and alkyl groups of 1 to 5 carbon atoms. m is an integer of preferably 0 to 20, and n is an integer of preferably 0 to 29. Preferably, the content of aromatic ring-containing substituents is 50 mol % or more of the total substituents contained in the silicone compound. When a mixture of silicone compounds is used as the silicone compound, the content of aromatic ring-containing substituents in the silicone compound mixture is preferably 50 mol % or more relative to the total substituents contained in the silicone compound mixture. That is, when the content of aromatic ring-containing substituents is 50 mol % or more, improved flame retardancy is obtained. The silicone compound is preferred to have a low reactivity. The reason is unknown; however, it is considered to be that, when a silicone compound of low reactivity is used in combination with the plant-derived resin, the resulting flame-retardant thermoplastic resin composition of the present invention shows no viscosity increase and accordingly no reduction in fluidity. Further, the silicone compound is preferred to have a molecular weight of 500 to 5,000. When the molecular weight of the silicone compound is 500 or more, the silicone compound per se causes neither vaporization nor decomposition at the kneading temperature or molding temperature of resin. When the molecular weight of the silicon composition is 5,000 or less, the flame-retardant thermoplastic resin composition of the present invention has good fluidity.

As the boron-based compound, there is particularly preferred an aromatic ring-containing boric acid ester. Such a boric acid ester has no particular restriction as to the structure as long as it causes neither vaporization nor decomposition at the kneading temperature or molding temperature of resin. The aromatic ring-containing boric acid ester may contain polar group including phenolic hydroxyl group, amino group, etc. There can be mentioned, for example, the following boric acid ester compounds.

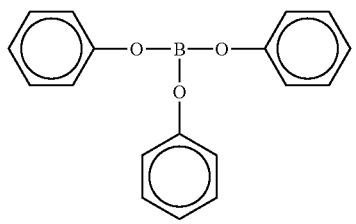

[Formula 2]

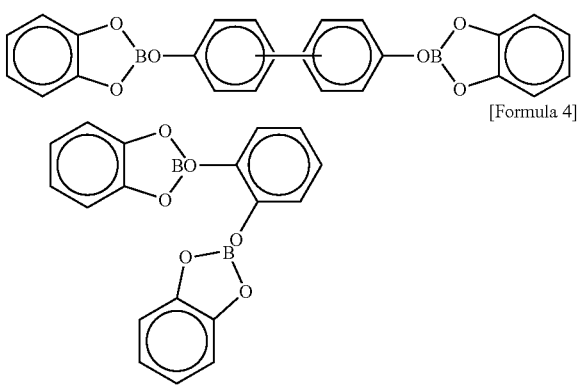

[Formula 3]

[Formula 4]

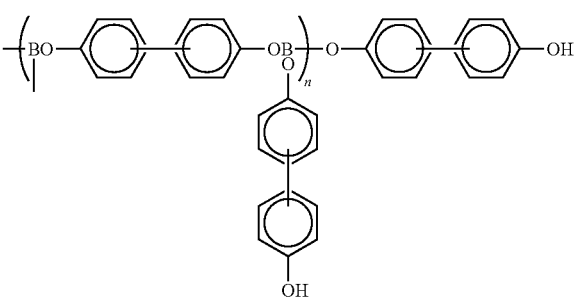

[Formula 5]

In the above formula, n is an integer of preferably 1 to 10.

The above formula is intended to show an example of the structure of the boric acid ester compound, and the structure of the boric acid ester compound is not restricted particularly to the above structure.

The weight proportion (expressed as Y) of the aromatic ring-containing compound (C) in the flame-retardant thermoplastic resin composition of the present invention is preferably in the following range:

0.5% by mass ≤ Y ≤ 20% by mass because, with such a weight proportion, the use amount of the metal hydrate can be reduced and there can be obtained superior heat resistance in addition to superior flame retardancy and superior fluidity. When the weight proportion Y of the aromatic ring-containing compound (C) is less than 0.5% by mass, enhancement in flame retardancy and fluidity may be insufficient. When the weight proportion Y of the aromatic ring-containing compound (C) is more than 20% by mass, there may be a reduction in heat resistance [in particular, heat distortion temperature (HDT)].

It was found that, when the aromatic ring-containing compound (C) is used in the flame-retardant thermoplastic resin composition of the present invention composed of a plant-derived resin (A) and a flame retardant (B), there are improvements not only in fluidity but also in flame retardancy. The reason therefor is not clear but is considered to be as follows. When the flame-retardant thermoplastic resin composition of the present invention containing the aromatic ring-containing compound (C) catches fire, a carbonized material (including a molten resin) is generated; this carbonized material combines with the metal hydrate which is a main component of the flame retardant (B) (the metal hydrate includes a metal oxide formed), to form a particular composite layer (a layer of a composite composed of the carbonized material, the molten resin, the metal hydrate and its oxide); this composite layer swells by taking in the water generated by the thermal decomposition of the metal hydrate and the decomposition gas (including a combustible gas) of the resin component in the resin composition, to form a heat-insulating layer capable of efficiently shielding the heat generated by fire; as a result, enhanced fame retardancy is obtained. It is further considered that the heat-insulating layer formed is also effective in capturing the decomposition gas of the resin and preventing the diffusion of the decomposition gas to outside and resultant spreading of resin combustion.

It is preferred that a nucleating agent (D) is added to the flame-retardant thermoplastic resin composition of the present invention. As the nucleating agent (D), there can be used an inorganic nucleating agent or an organic nucleating agent. As the inorganic nucleating agent, there can be mentioned, for example, clay mineral, calcium carbonate, boron nitride, synthetic silicic acid, silicate, silica, carbon black, zinc white, basic magnesium carbonate, quartz powder, glass fiber, glass powder, diatomaceous earth, dolomite powder, titanium oxide, zinc oxide, antimony oxide, barium sulfate, calcium sulfate, alumina, calcium silicate and boron nitride. Here, the clay mineral refers to a hydrous silicate produced as a main component of clay. As examples of the clay mineral, there can be mentioned allophane, hisingerite, phyllosilicate, pyroferrite, talc, mica, montmorillonite, vermiculite, chlorite, kaolin, inosilicate and palygorskite.

As the organic nucleating agent, there can be mentioned, for example, (1) organic carboxylic acids such as octylic acid, toluic acid, heptanoic acid, pelargonic acid, lauric acid, myristic acid, palmitic acid, stearic acid, behenic acid, cerotic acid, montanic acid, melissic acid, benzoic acid, p-tert-butylbenzoic acid, terephthalic acid, monomethyl terephthalate, isophthalic acid, monomethyl isophthalate, rhodinic acid, 12-hydroxystearic acid, cholic acid and the like; (2) alkali metal (alkaline earth metal) salts of organic carboxylic acids, for example, alkali metal (alkaline earth metal) salts of the above-mentioned organic carboxylic acids; (3) high-molecular organic compounds each containing a metal salt of carboxyl group, for example, metal salts of carboxyl group-containing polyethylene obtained by oxidation of polyethylene, carboxyl group-containing polypropylene obtained by oxidation of polypropylene, copolymer of olefin (e.g. ethylene, propylene or butene-1) and acrylic acid or methacrylic acid, copolymer of styrene and acrylic acid or methacrylic acid, copolymer of olefin and maleic anhydride, copolymer of styrene and maleic anhydride, and the like;

(4) aliphatic carboxylic acid amides such as oleamide, stearamide, erucamide, behenamide, N-oleylpalmitamide, N-stearylerucamide, N,N'-ethylenebis(stearamide), N,N'-methylenebis(stearamide), methylol stearamide, ethylenebis(oleamide), ethylenebis(behenamide), ethylenebis(stearamide), ethylenebis(lauramide), hexamethylenebis(oleamide), hexamethylenebis(stearamide), butylenebis(stearamide), N,N'-dioleylsebacamide, N,N'-dioleyladipamide, N,N'-distearyladipamide, N,N'-distearylsebacamide, m-xylylenebis(stearamide), N,N'-distearylisophthalamide, N,N'-distearylterephthalamide, N-oleyloleamide, N-stearyloleamide, N-stearylerucamide, N-oleylstearamide, N-stearylstearamide, N-butyl-N'-stearylurea, N-propyl-N'-stearylurea, N-allyl-N'-stearylurea, N-phenyl-N'-stearylurea, N-stearyl-N'-stearylurea, dimethyllauramide, dimethylstearamide, N,N'-cyclohexanebis (stearamide), N-lauroyl-L-glutamic acid-α, γ-n-butylamide and the like;

(5) high-molecular weight organic compounds, for example, polymer of 3-position-branched α-olefin of 5 or more carbon atoms (e.g. 3,3-dimethylbutene-1, 3-methylbutene-1, 3-methylpentene-1, 3-methylhexene-1, 3,5,5-trimethylhexene-1), polymer of vinylcycloalkane (e.g. vinylcyclopentane, vinylcyclohexane, vinylnorbornane), polyalkylene glycol (e.g. polyethylene glycol, polypropylene glycol), polyglycolic acid, cellulose, cellulose ester, cellulose ether, polyester, polycarbonate and the like;

(6) organic compounds of phosphoric acid or phosphorous acid, or metal salts thereof, for example, diphenyl phosphate, diphenyl phosphite, sodium salt of bis(4-tert-butylphenyl) phosphate, sodium salt of methylene(2,4,-tert-butylphenyl) phosphate, and the like;

(7) sorbitol derivatives such as bis(p-methylbenzylidene) sorbitol, bis(p-ethylbenzylidene)sorbitol and the like;

(8) cholesterol derivatives such as cholesteryl stearate, cholesteroxystearamide and the like; and (9) thioglycolic acid anhydride, p-toluenesulfonic acid, p-toluenesulfonic acid amide, and metals salt thereof.

Of the plant-derived resins usable in the present invention, polyester type resins typified by polylactic acid resin may be hydrolyzed to show a reduction in molecular weight. Therefore, among the above-mentioned nucleating agents, a nucleating agent composed of a neutral substance which does not promote the hydrolysis of polyester type resins is particularly preferably used. In order to prevent the molecular weight reduction of polyester type resin caused by ester exchange reaction, there is preferred, as a nucleating agent, an ester or amide derivative of a carboxyl group-containing nucleating agent, rather than a carboxyl group-containing nucleating agent. Similarly, it is preferred, as a nucleating agent, an ester or ether derivative of a hydroxyl group-containing nucleating agent, rather than a hydroxyl group-containing nucleating agent.

As to the organic nucleating agent, it is preferred to use a nucleating agent which is compatible with or finely dispersed in a resin in a high-temperature molten state in injection molding or the like, and separates out or causes phase separation in cooling step in mold, and functions as a nucleus for crystallization. The inorganic nucleating agent functions efficiently as a nucleus for crystallization when it is dispersed finely in a resin in the form of fine inorganic particles. It is preferred to subject the inorganic nucleating agent to a surface treatment for compatibilization (which refers to, for example, a coating treatment using a resin or compound having a compatibilizability, an ion exchange treatment, or a surface treatment using a coupling agent). The inorganic nucleating agent subjected to a surface treatment for compatibilization has a higher interaction with a resin and accordingly a higher dispersibility, whereby the agglomeration of nucleating agent is prevented.

It is possible to use a master batch wherein a nucleating agent (D) has been dispersed in the plant-derived resin such as polylactic acid resin or the like. When a nucleating agent (D) is used in a flame-retardant thermoplastic resin composition of the present invention, its weight proportion (expressed as Z) in the resin composition is preferably more than 0.05% by mass but not more than 20% by mass because, with such a proportion, good impact resistance is obtained and, moreover, the crystallization speed of crystalline resin (e.g. polylactic acid resin) increases and higher productivity is obtained. When the weight proportion Z of the nucleating agent (D) is more than 0.05% by mass, crystallization proceeds quickly and a higher production speed is obtained. Further, when the weight proportion Z of the nucleating agent (D) is not more than 20% by mass, the growth of cracks starting from the nucleating agent is suppressed particularly when the nucleating agent is an inorganic nucleating agent, whereby the flame-retardant thermoplastic resin composition of the present invention can have enhanced impact resistance.

It was found that, of the above-mentioned nucleating agents (D), the clay mineral (including talc, mica or kaolin), when used in combination with the above-mentioned, aromatic ring-containing compound (C) easily forming a carbonized product (referred to as char in some cases) upon ignition, allows the flame-retardant thermoplastic resin composition of the present invention to exhibit highly enhanced flame retardancy. The reason for this effect exhibited by the above combination use is not clear but is considered to be as follows. When the flame-retardant thermoplastic resin composition of the present invention containing the aromatic ring-containing compound (C) catches fire, a carbonized product (which includes a molten resin) is generated; this carbonized product combines with the metal hydrate (which includes a metal oxide formed), to form a composite layer; this composite layer swells by taking in the water generated by the thermal decomposition of the metal hydrate and the decomposition gas (which includes a combustible gas) of the resin component in the present resin composition, to form a heat-insulating layer; in this case, the clay mineral added prevents the vaporization of the water and the decomposition gas from inside the resin composition to outside; as a result, the composite layer swells more efficiently and comes to have a strikingly high heat-insulating property, resulting in significantly enhanced flame retardancy. It is further considered that since the heat-insulating layer formed prevents very effectively the vaporization of the decomposition gas of resin to outside, spreading of resin fire is suppressed highly.

The flame-retardant thermoplastic resin composition of the present invention may also contain a drip-proof agent (E). As the drip-proof agent (E), there can be mentioned organic fibers of polytetrafluoroethylene (PTFE), acryl-modified PTFE, etc. When the drip-proof agent (E) is used, the weight proportion thereof to the total weight of the flame-retardant thermoplastic resin composition of the present invention is preferably 1% by mass or less. When the weight proportion of the drip-proof agent (E) is 1% by mass or less, granulation in pellet production is easy.

It is also possible to use a high-strength fiber (F) to improve impact strength. As the high-strength fiber (F), there can be mentioned, for example, polyamide fibers (e.g. aramid fiber and nylon fiber), polyester fibers (e.g. polyarylate fiber and polyethylene terephthalate fiber), ultra-high strength polyethylene fiber, polypropylene fiber, carbon fiber, metal fibers and glass fiber.

The aramid fiber and the polyarylate fiber are particularly preferable because they are made of aromatic compounds, have higher heat resistance and higher strengths than other fibers, are light-colored and, when added to a resin, do not impair the appearance of resin, and are small in specific gravity.

As to the shape of the high-strength fiber (F), when the fiber section is not circular but polygonal or indefinite or odd-shaped and the fiber has a high aspect ratio or the fiber has a small fiber diameter, higher impact strength is obtained because with such a fiber, the contact area between resin and fiber is larger, resultantly the bonding strength between resin and fiber increases, and the relaxation of impact by detachment of fiber is increased and the impact strength is improved. Also, by using a fiber having unevenness on the surface, a fiber of wedge shape wherein the diameter is larger at the two ends than at the center, a fiber having constricted part or a non-linear, buckled fiber, the friction at the detachment of fiber increases and impact resistance is improved.

The high-strength fiber (F) can be subjected, as necessary, to a surface treatment in order to increase its affinity with a matrix resin or entanglement between fibers. Effective as the method for surface treatment are, for example, a treatment by a coupling agent of silane type, titanate type or the like; a treatment by ozone or plasma; and a treatment by a surfactant of alkyl phosphate type. However, the treatment method is not restricted thereto and treatment methods ordinarily used in surface modification of filler can be used.

The high-strength fiber (F) is particularly effective to improve impact resistance when it has an average fiber length of 1 to 10 mm. When the average fiber length of the high-strength fiber (F) is 1 mm or more, the energy absorption by fiber detachment is high and sufficient impact resistance is obtained. Further, when the average fiber length of the high-strength fiber (F) is 10 mm or less, good moldability is obtained. In using the high-strength fiber (F), the weight proportion of the fiber to the total weight of the flame-retardant thermoplastic resin composition of the present invention is preferably 10% by mass or less because superior impact resistance and moldability are obtained.

Besides the high-strength fiber (F), there can also be used plant fibers such as kenaf, flax and the like, and inorganic fibers such as glass fiber, carbon fiber and the like. These fibers preferably have an average fiber length of 10 mm or less. In the present invention, "plant fiber" refers to a plant-derived fiber and, as specific examples thereof, there can be mentioned fibers obtained from wood, kenaf, bamboo, hemp, etc. These fibers preferably have an average fiber length of 10 mm or less. The pulp, etc. obtained by removing lignin or pectin from these plant fibers are particularly preferred because they are low in deterioration such as decomposition or discoloration by heat. Kenaf and bamboo are high in photosynthesis speed and accordingly in growth speed and can absorb a large amount of carbon dioxide; therefore, they are useful also as a means for solving the environmental problems of global warming by carbon dioxide and forest destruction. Also, the high-strength fiber (F) and the organic fibers such as plant fibers mentioned above can function as a nucleating agent for resin and enhance the heat resistance [in particular, heat distortion temperature (HDT)] of the flame-retardant thermoplastic resin composition of the present invention.

In order to improve the impact resistance of the flame-retardant thermoplastic resin composition of the present invention, it is also possible to use a known flexible component. As such a flexible component, a plant-derived substance is preferred particularly and the following substances can be mentioned. Copolymers having a polymer block selected from the group consisting of polyester segment, polyether segment and polyhydroxycarboxylic acid segment; block copolymer formed by bonding of polylactic acid segment, aromatic polyester segment and polyalkylene ether segment to each other; block copolymer composed of polylactic acid segment and polycaprolactone segment; polymer composed mainly of alkyl unsaturated carboxylate unit; aliphatic polyesters (e.g. polybutylene succinate, polyethylene succinate, polycaprolactone, polyethylene adipate, polypropylene adipate, polybutylene adipate, polyhexamethylene adipate, and polybutylene succinate adipate); plasticizers such as polyethylene glycol and ester thereof; polyglycerin acetate; epoxidized soybean oil; epoxidized linseed oil; butyl ester of epoxidized linseed oil fatty acid; adipic acid-based aliphatic polyester; tributyl acetylcitrate; acetylricinoleic acid ester; saccharose-fatty acid ester; sorbitan-fatty acid ester; dialkyl adipate; alkylphthalyl alkylglycolate; and the like.

The plant-derived resin, when containing an ester bond in the structure, generally prone to be easily hydrolyzed. Therefore, in such a case, a known hydrolysis suppressor may be used together. As the hydrolysis suppressor, there can be used a compound which is reactive with the active hydrogen in the plant-derived resin. Here, as the active hydrogen, there can be mentioned the hydrogen of carboxyl group, hydroxyl group, amino group, amide group or the like in the plant-derived resin. As the compound reactive with the active hydrogen, there can be used the carbodiimide compounds, isocyanate compounds and oxazoline type compounds described in the patent Literature 1. Carbodiimide compounds having an aliphatic carbon chain can also be used. The compound reactive with the active hydrogen is not restricted to these, and compounds ordinarily used as a hydrolysis suppressor can be used.

In the present invention, there may be also used, as a flame-retardant aid, a compound promoting carbonization of resin (e.g. a carbonization-promoting catalyst). Examples of such a compound include compounds such as zinc molybdate, zinc stannate and the like, and substances obtained by coating such a compound on, for example, the surface of talc. However, the flame-retardant aid is not restricted to these.

Further, other flame retardant may be appropriately added as necessary to the flame-retardant thermoplastic resin composition of the present invention. As the other flame retardant, a nitrogen-based flame retardant and a phosphorus-based flame retardant can be mentioned. As the nitrogen-based flame retardant, there can be mentioned melamine, isocyanurate compounds, etc. As the phosphorus-based flame retardant, there can be mentioned red phosphorus, phosphate compounds, organophosphorus compounds, etc. However, in the flame-retardant thermoplastic resin composition of the present invention, the addition amounts of the flame-retardant aid and the other flame retardant may be small and thereby the reduction in moisture resistance, heat resistance, mechanical properties, etc. can be suppressed. The flame-retardant aid and the other flame retardant may be used by beforehand treating the high-strength fiber or the plant-derived fiber therewith.

To the flame-retardant thermoplastic resin composition of the present invention may furthermore be added as necessary an inorganic filler, a reinforcing agent, a coloring agent (e.g. titanium oxide), stabilizers (e.g. radical-capturing agent and antioxidant), an antimicrobial agent, a mildewcide, etc. As the inorganic filler, there can be used silica, alumina, sand, clay, slag, etc. As the reinforcing agent, there can be used an acicular inorganic substance, etc. As the antimicrobial agent, there can be used silver ion, copper ion, a zeolite containing such an ion, etc.

The above-mentioned flame-retardant thermoplastic resin composition of the present invention can be processed, by methods such as injection molding, film molding, blow molding, foam molding and the like, into molded materials used in electric or electronic applications (e.g. casing for electric appliances), building material applications, automotive part applications, daily necessity applications, medical applications, agricultural applications, etc.

As to the method for mixing various components of the flame-retardant thermoplastic resin composition of the present invention, there is no particular restriction, and there can be mentioned mixing by a known mixer such as tumbler, ribbon blender, single-screw or twin-screw kneader or the like, and melt mixing by an extruder, rolls or the like.

As to the method for molding the flame-retardant thermoplastic resin composition of the present invention, there is no particular restriction, and there can be used molding methods required in production of ordinary electric or electronic appliances, for example, known injection molding, injection-compression molding and compression molding. As to the temperature employed in the above melt mixing or molding, there can be selected a temperature which is at least higher than or equal to the melting temperature of the base resin and at which the plant fiber or the plant-derived resin are not deteriorated.

EXAMPLES

The present invention is described in more detail below by way of specific embodiments.

First, description is made on the raw materials used in Examples of the present invention and Comparative Examples. There are shown, in Table 1 and Table 2, raw materials used, that is, a plant-derived resin, metal hydrates, aromatic ring-containing compounds, a nucleating agent, a drip-proof agent, high-strength fibers and a flexible component.

TABLE 1

| Material | |
|---|---|
| Plant-derived resin | Polylactic acid resin 1 (produced by Unitika Ltd., TE-4000) |
| Metal hydrate | Aluminum hydroxide 1 ($Na_2O$ = 0.05% by mass, 50 mass % particle diameter = 3 μm) |
| | Aluminum hydroxide 2 ($Na_2O$ = 0.10% by mass, 50 mass % particle diameter = 3 μm) |
| | Aluminum hydroxide 3 ($Na_2O$ = 0.18% by mass, 50 mass % particle diameter = 3 μm) |
| | Aluminum hydroxide 4 ($Na_2O$ = 0.22% by mass, 50 mass % particle diameter = 3 μm) |
| | Aluminum hydroxide 5 ($Na_2O$ = 0.29% by mass, 50 mass % particle diameter = 3 μm) |
| Aromatic ring-containing compound | Phenol 1 (phenol novolac resin, dispersion degree (Mw/Mn) = 1.7, softening point = 106° C.) |
| | Silicone compound 1 (methyl phenyl branched silicone, D/T unit = 20 mol %/80 mol %, methyl group/phenyl group = 0 mol %/100 mol %, softening point = 77° C., Mw = 2000) |
| Nucleating agent | Talc (produced by Nippon Talc Co., Ltd., SG-2000, 50 mass % particle diameter = 1 μm) |
| Drip-proof agent | Polytetrafluoroethylene (PTFE, produced by Daikin Industries, ltd., Polyflon MPA FA-500) |
| High-strength fiber | Polyamide fiber (produced by Teijin Chemicals Ltd., TECHNORA, average fiber length = 3 mm, fiber diameter = 12 μm) |
| Flexible component | PD-150 (produced by Dainippon Ink and Chemicals, Incorporated) |

TABLE 2

| Material | |
|---|---|
| Metal hydrate | Aluminum hydroxide 6 ($Na_2O$ = 0.05% by mass, 50 mass % particle diameter = 1.5 μm) |
| High-strength fiber | Polyarylate fiber 1 (produced by Kuraray Co., Ltd., VECTRAN, average fiber length = 3 mm, fiber diameter = 12 μm) |
| | Polyarylate fiber 2 (produced by Kuraray Co., Ltd., VECTRAN, average fiber length = 3 mm, fiber diameter = 24 μm) |

TABLE 2-continued

| Material | |
|---|---|
| Fiber | Kenaf fiber (average fiber length = 3 mm) |
| | Glass fiber (produced by Asahi Glass Fiber Co., Ltd., average fiber length = 3 mm, fiber diameter = 10 μm) |

In Table 1 and Table 2, the total amount of $Na_2O$ was indicated as the total amount of alkali metal-based substances in each metal hydrate (aluminum hydroxide).

Next, there are shown the evaluation methods for flame retardancy, fluidity, heat resistance, impact resistance and hydrolysis resistance, used in Examples of the present invention and Comparative Examples.

(1) Kneading of Resin Compositions

The individual components for thermoplastic resin composition, shown in Examples and Comparative Examples were melt-mixed in a kneader (of dual screw type) controlled so that the temperature of the composition became about 190° C., to prepare pellets for injection molding.

(2) Preparation 1 of Evaluation Samples (Molding by Low-temperature Mold)

The pellets were dried at 100° C. for 7 hours or more and then molded into two kinds of molded sheets (1.6mm and 3.2 mm in thickness), using an injection molding machine at the mold temperature of 25° C. Then, each molded sheet was heated at 100° C. for 4 hours to crystallize the resin component to obtain two kinds of evaluation samples. The barrel temperature of the injection molding machine was set at 190° C. or 200° C.

(3) Preparation 2 of Evaluation Samples (Molding by High-temperature Mold)

The pellets were dried at 100° C. for 7 hours or more and then molded into two kinds of molded sheets (1.6 mm and 3.2 mm in thickness), using an injection molding machine at the mold temperature of 110° C., to obtain two kinds of evaluation samples. The barrel temperature of the injection molding machine was set at 190° C. or 200° C.

(4) Evaluation of Flame Retardancy

Each sample molded as above (thickness: 1.6 mm or 3.2 mm) was subjected to the vertical flame test specified by UL (Underwriter Laboratories) 94 Standard for evaluation of flame retardancy.

The criteria of flame retardancy is shown in Table 3.

TABLE 3

| Criteria Conditions | V-0 | V-1 | V-2 |
|---|---|---|---|
| Total flaming combustion time for each sample, $t_1$ or $t_2$ | ≦10 seconds | ≦30 seconds | ≦30 seconds |
| Total flaming combustion time of any group of sample by all treatments ($t_1 + t_2$ of 5 samples) | ≦50 seconds | ≦250 seconds | ≦250 seconds |
| Flaming and glowing combustion time for each sample after second flame application ($t_2 + t_3$) | ≦30 seconds | ≦30 seconds | ≦60 seconds |
| Flaming or glowing combustion of any sample to holding clamp | No | No | No |
| Label cotton ignited by flaming drips from sample | No | No | Yes |

When the flaming or glowing combustion was not in the criteria shown above, it was shown as "NOT". The order of flame retardancy level is V-0, V-1 and (V-2 or NOT) with V-0 being best.

(5) Evaluation of Fluidity (5-1) Fluidity Evaluated by Using a Mold at Ordinary Temperature Pellets were subjected to injection molding to form a 1 mm-thick molded article for evaluation of spiral flow, by setting the mold temperature at 25° C., the barrel temperature at 190° C. or 200° C., the injection pressure at 118 Mpa and the injection speed at 100 mm/s. The length of the molded article (the length is a spiral flow) was measured and taken as an indication of fluidity. A resin composition having a larger spiral flow is superior in fluidity.

(5-2) Fluidity Evaluated by Using a Mold at High Temperature

Pellets were subjected to injection molding to form a 1 mm-thick molded article for evaluation of spiral flow, by setting the mold temperature at 100° C., the barrel temperature at 190° C., the injection pressure at 157 Mpa and the injection speed at 100 mm/s. The length of the molded article was measured and taken as an indication of fluidity.

(6) Evaluation of Heat Resistance

A sample (a molded sheet) of 3.2 mm in thickness obtained in (2) or (3) was measured for heat distortion temperature (HDT) based on JIS K 7192-2 by setting the load at 1.8 Mpa, the temperature elevationt rate at 2° C./min and distance between fulcrums to 100 mm. The HDT was taken as an indication of heat resistance.

(7) Evaluation of Impact Resistance

A sample obtained in (3) was processed to prepare a test piece, and the test piece was subjected to a test based on JIS K 7110 Annex-1 (weight=2.75 J, angle of fling=150°). Izod impact value was calculated and taken as an indication of impact resistance. The test piece used here was No. 2 A type test piece and had a notch (d=2.54 mm, r=0.25 mm), a length (1) of 64 mm, a width (b) of about 3.2 mm and a thickness (t) of about 10.3 mm.

(8) Evaluation of hydrolysis resistance

Pellets obtained in (1) were immersed in chloroform and plant-derived resin (e.g. a polylactic acid resin) was dissolved and was subjected to gel permeation chromatography (GPC) to calculate the polystyrene equivalent molecular weight of the resin. The molecular weight was taken as an indication of hydrolysis resistance. Here, attention was paid particularly to number-average molecular weight (Mn) in order to examine the effect of the concentration of alkali metal-based substance in metal hydrate, on the reduction in molecular weight of plant-derived resin during kneading. When this molecular weight is larger, the reduction in molecular weight is smaller and the resin is superior in hydrolysis resistance.

Example 1

A resin composition was obtained by mixing 50% by mass of a polylactic acid resin 1 as plant-derived resin (A), 49.5% by mass of aluminum hydroxide (a metal hydrate) as flame retardant (B) and 0.5% by mass of PTFE as drip-proof agent (E). The resin composition was melt-mixed using a kneader to produce pellets. The temperature of the kneader was set so that the temperature of the resin composition became about 190° C.

The pellets were dried at 100° C. for 7 hours or more and then evaluation sample was molded from the pellet with an injection molding machine whose barrel temperature was set at 190° C.

Examples 2 to 23, Comparative Examples 1 to 4, Reference Example 1

Evaluation samples were molded in the same manner as in Example 1 except that there were used resin compositions each using a formulation shown in any of Tables 4 to 10.

Figure 2:
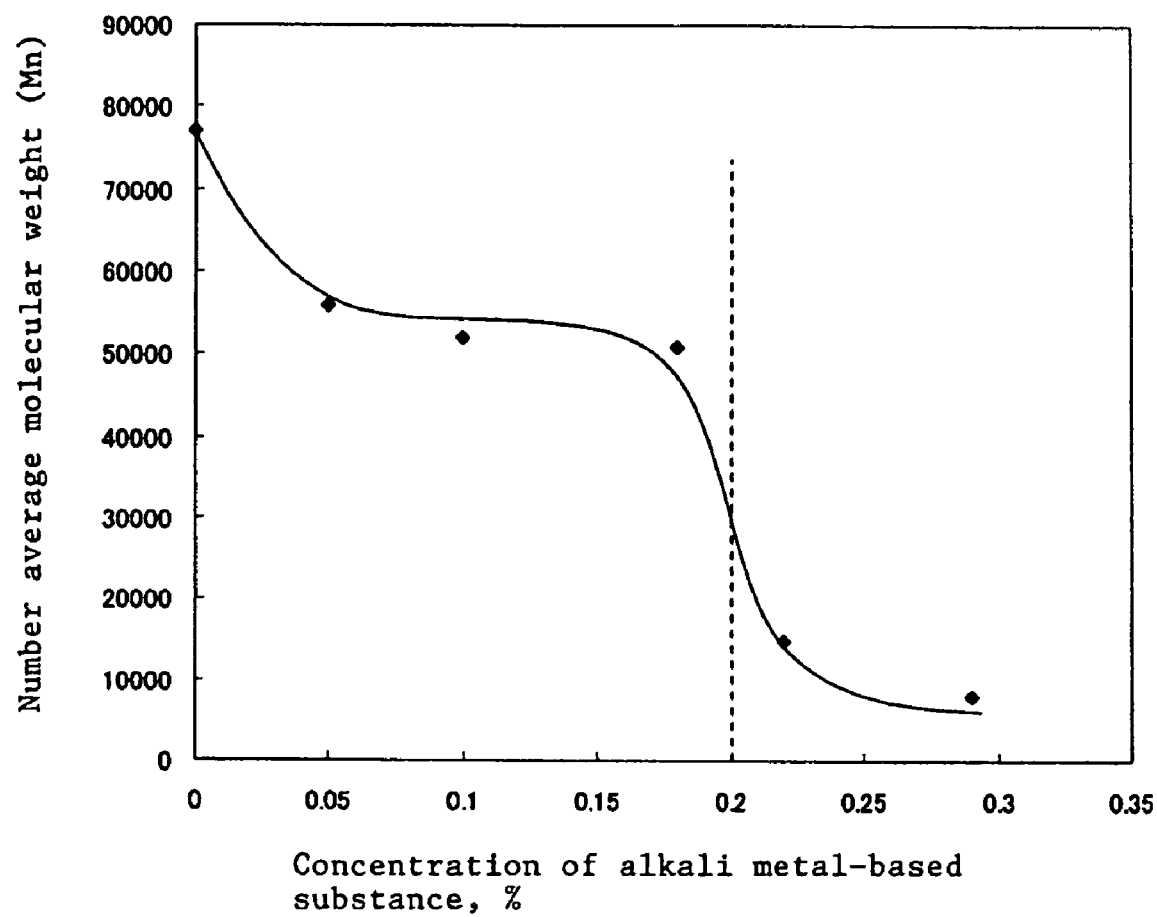
FIG. 2 shows a relation between the concentration of alkali metal-based substance and number-average molecular weight, in Examples 1 to 3 and Comparative Examples 1 and 2.

The results of evaluation for each sample are shown in Tables 4 to 10. Further, in FIG. 1 and FIG. 2 are shown, for the evaluation samples of Examples 1 to 3 and Comparative Examples 1 and 2, relations between the concentration of alkali metal-based substance and the total flaming and glowing combustion time specified by UL 94V and the number-average molecular weight.

TABLE 4

|  |  | Ex. 1 | Ex. 2 | Ex. 3 | Comp. Ex. 1 | Comp. Ex. 2 | Ref. Ex. 1 |
|---|---|---|---|---|---|---|---|
| Plant-derived resin | Polylactic acid resin 1 | 50 | 50 | 50 | 50 | 50 | 100 |
| Metal hydrate | Aluminum hydroxide 1 | 49.5 |  |  |  |  |  |
|  | Aluminum hydroxide 2 |  | 49.5 |  |  |  |  |
|  | Aluminum hydroxide 3 |  |  | 49.5 |  |  |  |
|  | Aluminum hydroxide 4 |  |  |  | 49.5 |  |  |
|  | Aluminum hydroxide 5 |  |  |  |  | 49.5 |  |
| Drip-proof agent | PTFE | 0.5 | 0.5 | 0.5 | 0.5 | 0.5 |  |
| Flame retardancy | UL 94 1.6 mm | V-1 | V-1 | V-1 | V-1 | V-1 | NOT |
|  | Total flaming combustion time, seconds | 80 | 90 | 95 | 190 | 205 | >250 |
| Hydrolysis resistance | Number-average molecular weight (Mn) | 56000 | 52000 | 51000 | 15000 | 8000 | 77000 |

TABLE 5

|  |  | Ex. 1 | Comp. Ex. 3 | Ex. 4 | Ex. 5 | Ex. 6 |
|---|---|---|---|---|---|---|
| Plant-derived resin | Polylactic acid resin 1 | 50 | 55 | 50 | 55 | 50 |
| Metal hydrate | Aluminum hydroxide 1 | 49.5 | 44.5 | 44.5 | 39.5 | 44.5 |
| Aromatic ring-containing compound | Phenol 1 | | | 5 | 5 | |
| | Silicone compound 1 | | | | | 5 |
| Drip-proof agent | PTFE | 0.5 | 0.5 | 0.5 | 0.5 | 0.5 |
| Flame retardancy | UL 94 3.2 mm | V-0 | NOT | V-0 | V-0 | V-0 |
| | Total flaming combustion time, seconds | 0 | >250 | 0 | 34 | 20 |
| | UL 94 1.6 mm | V-1 | NOT | V-1 | NOT | V-1 |
| | Total flaming combustion time, seconds | 80 | >250 | 44 | >250 | 55 |
| Fluidity, 190° C. | Spiral flow, mm | 90 | 97 | 114 | 149 | 103 |
| Heat resistance | Heat distortion temp., ° C. | 106 | 102 | 82 | 75 | 90 |
| Hydrolysis resistance | Number-average molecular weight (Mn) | 56000 | 60000 | 66000 | 70000 | 68000 |

TABLE 6

|  |  | Ex. 4 | Comp. Ex. 4 | Ex. 7 | Ex. 8 | Ex. 9 |
|---|---|---|---|---|---|---|
| Plant-derived resin | Polylactic acid resin 1 | 50 | 50 | 45 | 40 | 30 |
| Metal hydrate | Aluminum hydroxide 1 | 44.5 | 44.5 | 44.5 | 44.5 | 44.5 |
| Aromatic ring-containing compound | Phenol 1 | 5 | | 5 | 5 | 5 |
| Nucleating agent | Talc | | 5 | 5 | 5 | 5 |
| Drip-proof agent | PTFE | 0.5 | 0.5 | 0.5 | 0.5 | 0.5 |
| High-strength fiber | Polyamide fiber | | | | 5 | 5 |
| Flexible component | PD-150 | | | | | 10 |
| Flame retardancy | UL 94 1.6 mm | V-1 | NOT | V-0 | V-0 | V-1 |
| | Total flaming combustion time, seconds | 44 | >250 | 5 | 9 | 31 |
| Fluidity 190° C. | Spiral flow, mm | 114 | 86 | 96 | 91 | 116 |
| 200° C. | Spiral flow, mm | Not evaluated | 103 | 113 | 118 | 135 |
| Heat resistance | Heat distortion temp., ° C. | 82 | 110 | 85 | 108 | 75 |
| Impact resistance (low-temp. mold) | Izod impact value, Kj/m$^2$ | 1.6 | Not evaluated | 1.3 | 4.6 | Not evaluated |
| Impact resistance (high-temp. mold) | Izod impact value, Kj/m$^2$ | Impossible to evaluate | 1.5 | 1.7 | 4.2 | 5.1 |

TABLE 7

|  |  | Ex. 7 | Ex. 10 | Ex. 11 | Ex. 8 | Ex. 12 |
|---|---|---|---|---|---|---|
| Plant-derived resin | Polylactic acid resin 1 | 45 | 45 | 45 | 40 | 40 |
| Metal hydrate | Aluminum hydroxide 1 | 44.5 | 49.5 | 54.5 | 44.5 | 45 |
| Aromatic ring-containing compound | Phenol 1 | 5 | 5 | — | 5 | 5 |
| Nucleating | Talc | 5 | — | — | 5 | 5 |

TABLE 7-continued

|  |  | Ex. 7 | Ex. 10 | Ex. 11 | Ex. 8 | Ex. 12 |
|---|---|---|---|---|---|---|
| agent |  |  |  |  |  |  |
| Drip-proof agent | PTFE | 0.5 | 0.5 | 0.5 | 0.5 | — |
| High-strength fiber | Polyamide fiber | — | — | — | 5 | 5 |
| Flame retardancy | UL 94 1.6 mm | V-0 | V-0 | V-1 | V-0 | V-0 |
|  | Total flaming combustion time, seconds | 5 | 25 | 60 | 9 | 15 |
| Fluidity 190° C. | Spiral flow, mm | 96 | Not evaluated | Not evaluated | 91 | 93 |
| 200° C. | Spiral flow, mm | 113 | Not evaluated | Not evaluated | 118 | 121 |
| Heat resistance | Heat distortion temp., ° C. | 85 | Not evaluated | Not evaluated | 108 | 111 |
| Impact resistance (low-temp. mold) | Izod impact value, Kj/m$^2$ | 1.3 | Not evaluated | Not evaluated | 4.6 | 4.7 |
| Impact resistance (high-temp. mold) | Izod impact value, Kj/m$^2$ | 1.7 | Not evaluated | Not evaluated | 4.2 | 4.3 |

TABLE 8

|  |  | Ex. 1 | Ex. 13 |
|---|---|---|---|
| Pant-derived resin | TE-4000 | 50 | 50 |
| Metal hydrate | Aluminum hydroxide 1 | 49.5 | — |
|  | Aluminum hydroxide 6 | — | 49.5 |
| Aromatic ring-containing compound | Phenol 1 (phenolic resin) | — | — |
| Drip-proof agent | PTFE | 0.5 | 0.5 |
| Impact-resistant fiber | Polyamide fiber (dia. 12 μm) | — | — |
|  | Polyarylate fiber 1 (dia. 12 μm) | — | — |
| Flexible component | PD-150 | — | — |
| Nucleating agent | Talc | — | — |
| Kenaf fiber |  | — | — |
| Glass fiber |  | — | — |
| Flame retardancy | UL 94 1.6 mm | V-1 | V-0 |
|  | Total flaming combustion time (seconds) | 80 | 37 |
| Fluidity (spiral flow) | Ordinary temp. (25° C.) mold, 118 MPa (mm) | 90* | 95* |
| Heat resistance | Heat distortion temp. (HDT) (° C.) | 106 | 103 |
| Impact resistance (high-temperature mold) | Izod impact value (kJ/m$^2$) | 1.7 | 1.8 |

*Value at a barrel temperature of 190° C.

TABLE 9

|  |  | Ex. 12 | Ex. 14 | Ex. 15 |
|---|---|---|---|---|
| Pant-derived resin | TE-4000 | 40 | 40 | 40 |
| Metal hydrate | Aluminum hydroxide 1 | 45 | 45 | 45 |
|  | Aluminum hydroxide 6 | — | — | — |
| Aromatic ring-containing compound | Phenol 1 (phenolic resin) | 5 | 5 | 5 |
| Drip-proof agent | PTFE | — | — | — |
| Impact-resistant fiber | Polyamide fiber (dia. 12 μm) | 5 | — | — |
|  | Polyarylate fiber 1 (dia. 12 μm) | — | 5 | — |
|  | Polyarylate fiber 2 (dia. 24 μm) | — | — | 5 |
| Flexible component | PD-150 | — | — | — |
| Nucleating agent | Talc | 5 | 5 | 5 |
| Kenaf fiber |  | — | — | — |
| Glass fiber |  | — | — | — |
| Flame retardancy | UL 94 1.6 mm | V-0 | V-0 | V-1 |
|  | Total flaming combustion time (seconds) | 15 | 22 | 46 |
| Fluidity (spiral flow) | Ordinary temp. (25° C.) mold, 118 MPa (mm) | 93* | Not measured | Not measured |
|  | High temp. (100° C.) mold, 157 MPa (mm) | 128 | 116 | 117 |
| Heat resistance | Heat distortion temp. (HDT) (° C.) | 111 | 94 | 89 |
| Impact resistance (high-temperature mold) | Izod impact value (kJ/m$^2$) | 4.3 | 9.6 | 6.0 |

*Value at a barrel temperature of 190° C.

TABLE 10

|  |  | Ex. 14 | Ex. 16 | Ex. 17 | Ex. 18 | Ex. 19 | Ex. 20 | Ex. 21 | Ex. 22 | Ex. 23 |
|---|---|---|---|---|---|---|---|---|---|---|
| Plant-derived resin | TE-4000 | 40 | 35 | 35 | 30 | 30 | 25 | 25 | 30 | 30 |
| Metal hydrate | Aluminum hydroxide 1 | 45 | 45 | — | — | — | — | — | — | — |
|  | Aluminum hydroxide 6 | — | — | 45 | 45 | 45 | 45 | 45 | 45 | 45 |
| Aromatic ring-containing compound | Phenol 1 (phenolic resin) | 5 | 5 | 5 | 5 | 5 | 5 | 5 | — | — |
| Drip-proof agent | PTFE | — | — | — | — | — | — | — | — | — |
| Impact resistant fiber | Polyamide fiber (dia. 12 μm) | — | — | — | — | — | — | — | — | — |
|  | Polyarylate fiber 1 (dia. 12 μm) | 5 | 5 | 5 | 5 | 5 | 5 | 5 | 5 | 5 |
|  | Polyarylate fiber 2 (dia. 24 μm) | — | — | — | — | — | — | — | — | — |
| Flexible component | PD-150 | — | 5 | 5 | 5 | 5 | 10 | 10 | 10 | 10 |
| Nucleating agent | Talc | 5 | 5 | 5 | 5 | 5 | 5 | 5 | 5 | 5 |
| Kenaf fiber |  | — | — | — | 5 | — | 5 | — | 5 | — |
| Glass fiber |  | — | — | — | — | 5 | — | 5 | — | 5 |
| Flame retardancy | UL 94 1.6 mm | V-0 | V-1 | V-1 | V-0 | V-0 | V-0 | V-0 | V-1 | V-1 |
|  | Total flaming combustion time (seconds) | 22 | 75 | 53 | 29 | 2 | 14 | 0 | 140 | 108 |
| Fluidity (spiral flow) | High-temperature (100° C.) mold, 157 MPa (mm) | 116 | 136 | 146 | 129 | 134 | 141 | 151 | 131 | 138 |
| Heat resistance | Heat distortion temperature (HDT) (° C.) | 94 | 81 | 88 | 99 | 102 | 93 | 98 | 115 | 117 |
| Impact resistance (high-temperature mold) | Izod impact value (kJ/m$^2$) | 9.6 | 10.8 | 9.4 | 10 | 9.2 | 9.8 | 8.8 | 9.0 | 8.5 |

As is clear from the results of Tables 4 to 10, the flame-retardant thermoplastic resin composition of the present invention is superior in flame retardancy to the resin compositions of Comparative Examples each employing a conventional technique. The flame-retardant thermoplastic resin composition of the present invention containing an aromatic ring-containing compound is good not only in flame retardancy but also in fluidity. The flame-retardant thermoplastic resin composition of the present invention further containing a nucleating agent is higher in flame retardancy. The flame-retardant thermoplastic resin composition of the present invention furthermore containing a high-strength fiber is good not only in flame retardancy and fluidity but also in impact resistance and heat resistance.

As is clear from the comparison between Examples 1 to 3 and Comparative Examples 1 and 2, shown in Table 4, a flame-retardant thermoplastic resin composition superior in flame retardancy and good in hydrolysis resistance can be obtained by adding, to a plant-derived resin (A), a metal hydrate containing an alkali metal-based substance in an amount of 0.2% by mass or less, as a flame retardant (B).

As is clear from the comparison of Examples 4 to 6 with Example 1 and Comparative Example 3, shown in Table 5, a flame-retardant thermoplastic resin composition superior in flame retardancy and good in hydrolysis resistance can be obtained by using a plant-derived resin (A) and a metal hydrate containing an alkali metal-based substance in an amount of 0.2% by mass or less, as a flame retardant (B) and further using an aromatic ring-containing compound (C).

As is clear from the comparison of Example 7 with Example 4 or Comparative Example 4, shown in Table 6 and the comparison of Example 7 with Examples 10 and 11, shown in Table 7, the flame retardancy of the flame-retardant thermoplastic resin composition of the present invention can be made higher by using a plant-derived resin (A) and a metal hydrate containing an alkali metal-based substance in an amount of 0.2% by mass or less, as a flame retardant (B) and further using an aromatic ring-containing compound (C) and a nucleating agent (D). That is, the combined use of an aromatic ring-containing compound (C) and a nucleating agent (D) has an synergistic effect of significantly enhancing flame retardancy.

As is clear from the comparison of Examples 8 and 12 with Example 7, shown in Table 7, the impact resistance of the flame-retardant thermoplastic resin composition of the present invention is enhanced uniquely by using a plant-derived resin (A) and a metal hydrate containing an alkali metal-based substance in an amount of 0.2% by mass or less, as a flame retardant (B), further using an aromatic ring-containing compound (C) and a nucleating agent (D) and furthermore using a high-strength fiber (F).

As is clear from the comparison between Example 9 and Example 8, shown in Table 6, the impact resistance of the flame-retardant thermoplastic resin composition of the present invention is enhanced further by using a plant-derived resin (A) and a metal hydrate containing an alkali metal-based substance in an amount of 0.2% by mass or less, as a flame retardant (B), further using an aromatic ring-containing compound (C), a nucleating agent (D) and a high-strength fiber (F) and furthermore using a flexible component.

As is clear from the comparison between Example 1 and Example 13, shown in Table 8 and the comparison between Example 16 and Example 17, shown in Table 10, the flame retardancy of the flame-retardant thermoplastic resin composition of the present invention is enhanced further by using a metal hydrate having small particle diameters, as a flame retardant (B).

As is clear from the comparison between Example 12 and Example 14, shown in Table 9, the impact resistance of the flame-retardant thermoplastic resin composition of the present invention is enhanced further when a polyarylate fiber is used as a high-strength fiber (F), as compared with when a polyamide fiber is used.

As is clear from the comparison between Example 14 and Example 15, shown in Table 9, the flame-retardant thermoplastic resin composition of the present invention is enhanced further not only in impact resistance but also in flame retardancy, by using a high-strength fiber (F) of smaller fiber diameter.

As is clear from the comparison between Example 14 and Example 16, shown in Table 10, the flame-retardant thermoplastic resin composition of the present invention is enhanced further in fluidity and impact resistance by using a flexible component.

As is clear from the comparison between Example 17 and Example 18, shown in Table 10, the flame-retardant thermoplastic resin composition of the present invention is enhanced further in heat resistance by using a kenaf fiber.

As is clear from the comparison between Example 17 and Example 19, shown in Table 10, the flame-retardant thermoplastic resin composition of the present invention is enhanced further in heat resistance by using a glass fiber.

As is clear from the comparison between Example 18 and 20 and the comparison between Example 19 and Example 21, shown in Table 10, the flame-retardant thermoplastic resin composition of the present invention is enhanced further in fluidity by increasing the amount of a flexible component.

INDUSTRIAL APPLICABILITY

The flame-retardant thermoplastic resin composition of the present invention can be processed, by a molding method such as injection molding, film molding, blow molding, foam molding or the like, into molded materials used in electric and electronic appliances, building materials, automotive parts, daily necessities, medical field, agricultural field, toys, pleasure goods, etc.

The invention claimed is:

1. A flame-retardant thermoplastic resin composition comprising at least a plant-derived resin which is a polylactic acid resin (A) and a flame retardant (B), wherein the weight proportions of the individual components in the flame-retardant thermoplastic resin composition are:

$$30 \leq W_1 < 55.5$$

$$44.5 < X_1 \leq 70$$

wherein $W_1$ is the percentage by mass of the plant-derived resin (A) and $X_1$ is the percentage by mass of the flame retardant (B), 90% by mass or more of the flame retardant (B) comprises aluminum hydroxide containing sodium oxide in an amount of 0.2% by mass or less, and the number average molecular weight of the polylactic acid resin is at least 30,000.

2. The flame-retardant thermoplastic resin composition according to claim 1, further comprising a drip-proof agent (E) in a weight proportion of 1% by mass or less to the total mass of the flame-retardant thermoplastic resin composition.

3. The flame-retardant thermoplastic resin composition according to claim 2, further comprising a high-strength fiber (F) in a weight proportion of 10% by mass or less to the total mass of the flame-retardant thermoplastic resin composition.

4. The flame-retardant thermoplastic resin composition according to claim 1, further comprising a high-strength fiber (F) in a weight proportion of 10% by mass or less to the total mass of the flame-retardant thermoplastic resin composition.

5. A flame-retardant thermoplastic resin composition comprising at least a plant-derived resin which is a polylactic acid resin (A), a flame retardant (B) and an aromatic ring-containing compound (C), wherein the weight proportions of the individual components in the flame-retardant thermoplastic resin composition are:

$$25 \leq W_2 < 55.5$$

$$39.5 \leq X_2 \leq 70$$

$$0.5 \leq Y \leq 20$$

wherein $W_2$ is the percentage by mass of the plant-derived resin (A), $X_2$ is the percentage by mass of the flame retardant (B), and Y is the percentage by mass of the aromatic ring-containing compound (C), and 90% by mass or more of the flame retardant (B) comprises aluminum hydroxide containing sodium oxide in an amount of 0.2% by mass or less, and the number average molecular weight of the polylactic acid resin is at least 30,000.

6. The flame-retardant thermoplastic resin composition according to claim 5, wherein the aromatic ring-containing compound (C) is a compound selected from the group consisting of phenols, silicone compounds and boron compounds.

7. The flame-retardant thermoplastic resin composition according to claim 6, further comprising a drip-proof agent (E) in a weight proportion of 1% by mass or less to the total mass of the flame-retardant thermoplastic resin composition.

8. The flame-retardant thermoplastic resin composition according to claim 6, further comprising a high-strength fiber (F) in a weight proportion of 10% by mass or less to the total mass of the flame-retardant thermoplastic resin composition.

9. The flame-retardant thermoplastic resin composition according to claim 5, further comprising a drip-proof agent (E) in a weight proportion of 1% by mass or less to the total mass of the flame-retardant thermoplastic resin composition.

10. The flame-retardant thermoplastic resin composition according to claim 5, further comprising a high-strength fiber (F) in a weight proportion of 10% by mass or less to the total mass of the flame-retardant thermoplastic resin composition.

11. A flame-retardant thermoplastic resin composition comprising at least a plant-derived resin which is a polylactic acid resin (A), a flame retardant (B), an aromatic ring-containing compound (C) and a nucleating agent (D), wherein the weight proportions of the individual components in the flame-retardant thermoplastic resin composition are:

$$25 \leq W_3 < 55.5$$

$$29.5 \leq X_3 \leq 70$$

$$0.5 \leq Y \leq 20$$

$$0.05 < Z \leq 20$$

wherein $W_3$ is the percentage by mass of the plant-derived resin (A), $X_3$ is the percentage by mass of the flame retardant (B), Y is the percentage by mass of the aromatic ring-containing compound (C), and Z is the percentage by mass of the nucleating agent (D), 90% by mass or more of the flame retardant (B) comprises aluminum hydroxide containing sodium oxide in an amount of 0.2% by mass or less, and the number average molecular weight of the polylactic acid resin is at least 30,000.

12. The flame-retardant thermoplastic resin composition according to claim 11, wherein the aromatic ring-containing compound (C) is a compound selected from the group consisting of phenols, silicone compounds and boron compounds.

13. The flame-retardant thermoplastic resin composition according to claim 11, further comprising a drip-proof agent (E) in a weight proportion of 1% by mass or less to the total mass of the flame-retardant thermoplastic resin composition.

14. The flame-retardant thermoplastic resin composition according to claim 11, further comprising a high-strength fiber (F) in a weight proportion of 10% by mass or less to the total mass of the flame-retardant thermoplastic resin composition.

* * * * *